United States Patent [19]
Haver

[11] 3,792,519
[45] Feb. 19, 1974

[54] METHOD FOR PRODUCING MULTI-LAYER FILTER DISCS

[76] Inventor: Fritz Haver, 474 Oelde, Birkenweg, Germany

[22] Filed: July 21, 1971

[21] Appl. No.: 164,911

Related U.S. Application Data
[63] Continuation-in-part of Ser. No. 726,941, May 6, 1968, abandoned.

[30] Foreign Application Priority Data
May 5, 1967  Germany.................................. 62639

[52] U.S. Cl............. 29/163.5 F, 29/414, 29/471.1, 29/480, 156/250
[51] Int. Cl............................................. B23p 15/16
[58] Field of Search.... 29/163.5 F, 414, 417, 471.1, 29/471.3, 472.3, 480, 481; 156/250, 251, 253; 264/153, 156, 163

[56] References Cited
UNITED STATES PATENTS

| | | | |
|---|---|---|---|
| 2,747,265 | 5/1956 | Boessenkool...................... | 29/480 X |
| 3,318,748 | 5/1967 | Hurst................................ | 156/251 X |
| 3,445,910 | 5/1969 | Duryee et al............... | 29/163.5 F X |
| 3,614,822 | 10/1971 | Brown.......................... | 29/163.5 F X |
| 3,690,606 | 9/1972 | Pall.............................. | 29/163.5 F X |

Primary Examiner—Charles W. Lanham
Assistant Examiner—V. A. DiPalma
Attorney, Agent, or Firm—Burgess, Dinklage & Sprung

[57] ABSTRACT

Method of producing a multi-layer filter from a multiplicity of flat filter elements such as wire gauze, perforated sheet or the like where the individual filter elements have different degrees of fineness, including arranging the multiplicity of filter elements in an assembly having smooth gradations of fineness with the finest material at one end and the coarsest material at the other end of the assembly; welding or soldering the assembly of filter elements together in an area including the periphery of the final multi-layer filter to be made; aligning the welded or soldered assembly in a conventional punching means having a punching tool with the end of the assembly containing the finest filter element directed toward the punching tool and with the punching tool aligned with the welded or soldered area, and activating the punching means whereby to cut out a filter from said assembly within the welded or soldered area and at the same time forcing the finer filter layers at least partially around the next adjacent more coarse filter layers and stretching the filter layers in proportion to their fineness.

3 Claims, 3 Drawing Figures

METHOD FOR PRODUCING MULTI-LAYER FILTER DISCS

This application is a continuation in part of application Ser. No. 726,941, filed May 6, 1968, now abandoned.

This invention relates to composite filter assemblies. It more particularly refers to such an assembly of a multiplicity of individual filter elements of graduated mesh size and to a method of making such.

The filter discs are used for the removal of undesired foreign substances, undissolved particles, etc., from liquids, solutions or gases and are installed in pipelines or systems through which said fluids flow. In the known multi-layer filter discs the individual layers are surrounded by a sheet-metal edge. The edge is generally made of aluminum or stainless steel sheet; it holds the individual layers together and at the same time serves as a seal.

For instance, for a multi-layer filter disc having a diameter of 100 mm, a ring having an inside diameter of 90 mm and an outside diameter of 115 mm is formed by stamping. It was previously attempted to use the inner disc of a diameter of 90 mm obtained in the stamping for smaller filter discs. Today these inner discs are in general considered waste. It is also known to eliminate this edge mounting and replace such by substantially cheaper packing rings.

The inserting of the individual layers into the sheet-metal ring was heretofore effected in the following manner:

The individual filter discs of different layers of the same or equal fineness of filter are, after the stamping, placed, separated as to types, in containers. They are then placed generally individually and in proper sequence into the mounting ring provided with a raised edge, which is thereupon closed so that the individual layers are then pressed against each other.

In most cases, the filter discs consist of layers of graded fineness of filter. The layer having the smallest opening, for instance, only 10 microns, determines the filter action. With this layer there are associated additional layers of greater filter openness. Through these coarser layers there is obtained the highest possible intrinsic stability, particularly as the filter discs are frequently subjected to pressures of up to 50 atmospheres gauge and more.

In the previous method of inserting the individual layers of different filter fineness by hand, there is the danger of a mistake in stacking, since each individual layer must be inserted in the correct sequence.

In so far as the filter discs are made of wire gauzes of different mesh size, the outer fine layer of gauze is frequently still not stretched sufficiently smoothly not only in the case of the previous method of manufacture but also in the case of the new method of manufacture disclosed herein. It is another aspect of this invention to impart the desired tension to the wire gauze by this punching-out operation after welding.

While in the case of the known methods of manufacture the layers had to be first of all individually punched out, this is no longer necessary in accordance with the present invention. The wire gauze or perforated sheet or the like is cut only into strips which are placed one above the other in the desired sequence and fed to a welding machine or a soldering or bonding device. These devices produce a connecting seam of circular or other shape. The welding, soldering or binding device can be followed by a punch.

Filter elements of the prior art and of the instant invention are suitably wire gauze, perforated metal or plastic sheets or the like. They may be of substantially any shape desired, round or other geometrically regular shape, or free form to conform to the particular shape of the filter housing.

Both in the prior art and in the instant invention, each filter element assembly is usually made up of a multiplicity of individual filter elements which are all made of the same material. While this is the usual construction, it is not necessarily the only construction. It is also possible to use filter elements of different materials in a single assembly should that arrangement be desired.

It is an object of this invention to provide an improved method of producing multi-layer filter assemblies.

It is another object of this invention to provide an improved filter assembly.

Other and additional objects of this invention will become apparent from a consideration of this entire specification, including the claims and the drawing hereof.

In accord with and fulfilling these objects, one aspect of this invention resides in a novel method of producing a novel multi-layer filter assembly having multiple individual filter elements of varying pore opening size graduated from one end element to the opposite end element wherein the multiple elements are peripherally joined together by welding or soldering, and wherein the smaller pore sized elements overlap and are at least partially wrapped over the edges of the next adjacent larger sized filter element.

According to this novel method, appropriate mesh or pore size individual sheets of filter element stock are arranged and stacked in ascending graduated order of pore or mesh fineness; these sheets are joined together by welding or soldering in an area encompassing and generally corresponding to the peripheral shape and size desired of the final filter assembly; the joined assembly of sheets is then placed in a conventional punching means with the end of the assembly having the filter element of the finest mesh or pore size facing the punching means; and a composite filter assembly is produced of the desired size and ahspe by punching such out of the joined assembly within the welded or soldered area so that the punching operation causes the finer mesh elements to be forced over and around the outside edges of the next adjacent larger element and to thereby stretch each filter element taut.

Further characteristics and features of the invention will become evident from the following description of illustrative embodiments.

Figure 2:
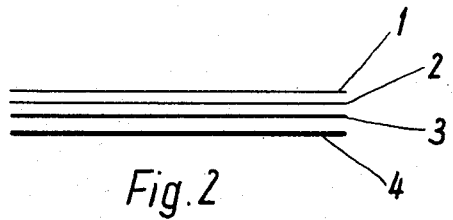
FIG. 2 is a section along the line II – II of FIG. 1, with the layers separated from each other.

The filter discs can consist, for instance, of four layers as shown in FIG. 2. The upper layers 1 and 2 are fine wire gauzes. The lower layers 3 and 4 are provided with wide mesh openings and assure a sufficient inherent stability of the filter disc.

For manufacture, one proceeds from superimposed strips 5 which are connected with one another in a welding apparatus.

Figure 1:
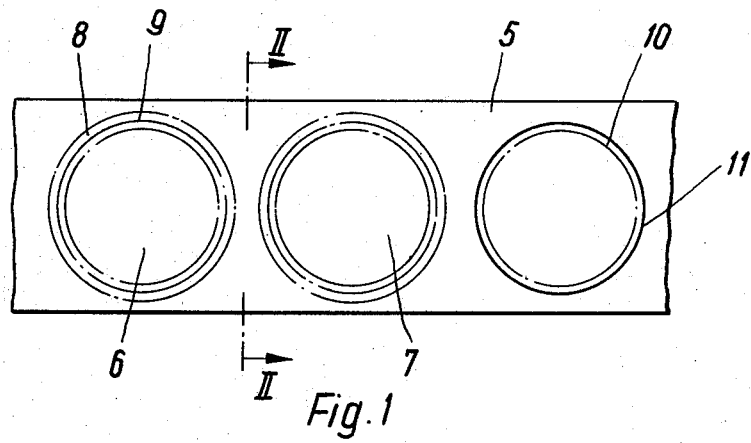
FIG. 1 shows several layers of strips of wire gauze stacked one above the other, seen in plan view.

In FIG. 1 there are shown assemblies 6 and 7 which are to be made out of the strip 5. The strip is provided with wide circular welded areas 8, the outer edges of which are illustrated in the drawing by the dot-dash lines. These assemblies are cut out along a punch line 9, which is shown as a solid circle, which lies within the weld seam area 8 so that even after the punching out of the assemblies 6 and 7, the individual filter elements are still dependably joined together at their edges.

While the assemblies 6, 7 are shown in FIG. 1 in the shape of circles, it is also possible to develop them as polygonal discs or even smooth edge non-circular objects.

Figure 3:
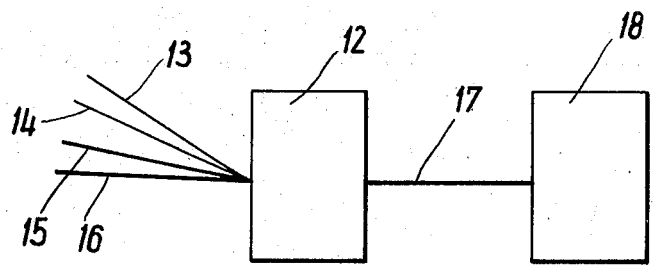
FIG. 3 is a schematic diagram of a device for the carrying out of the method of the invention.

In FIG. 3 an apparatus for the carrying out of the method is shown diagrammatically. The strips 13, 14, 15 and 16 are fed, in unjoined form, into a conventional welding device 12. In the welding device, the strips are welded together in an area encompassing the outer contour of the final filter assembly being made. The composite strip 17, now consisting of several joined elements, is fed from the welding device 12 to a conventional punching device 18 with the finest filter element directed toward the punch. As the punch cuts out the filter assembly within the welded area, it also stretches the finer filter elements and causes them to more or less overlap their next adjacent larger mesh filter element.

For the welding, a continuous or an intermittent weld seam can be used. For the connecting together of the individual layers, a continuous or interrupted edge bonding or soldering can also be employed.

Where soldering is to be used to join the sheets of filter element stock, the areas of the sheets to be joined are suitably treated with flux in the conventional manner, solder placed thereon and then heated to melting with any conventional heating source such as a soldering iron or the like. As the solder melts, it penetrates through the meshes of the filter elements and, upon solidifying, bonds the various filter elements together in conventional soldering manner. As with welding, the soldering can be intermittent if desired.

In accord with this invention both the soldering and the welding techniques used herein are conventional in all respects. Care must be taken, however, to insure that the technique used is consistent and compatible with the composition of the filter elements being joined. Thus it is clear that where the filter elements are metal, welding can probably be at a higher temperature than where the elements are of a thermoplastic material. Similarly, the solder chosen must reflect the particular material or materials being joined. Selection of appropriate welding temperatures and techniques, as well as the specific solder, are well within the scope of the routineer in the art.

What is claimed is:

1. Method of producing a multi-layer filter assembly which comprises arranging and juxtaposing a multiplicity of individual sheets of filter element material in ascending order of filter fineness so that one end sheet has the finest mesh size and the opposite end sheet has the coarsest pore size; substantially permanently joining said sheets together in an area of a configuration and size which overlaps the configuration and size of the multi-layer filter assembly sought to be made; inserting such joined sheets in a punching means having a punch member of the configuration and size of the multi-layer filter assembly sought to be made; positioning said joined sheets in said punching means so that said finest mesh size sheet is directed toward said punch member; aligning said punch member with said sheet joining area; and punching out said multi-layer filter assembly while simultaneously stretching the finer mesh filter elements over their next adjacent coarser filter element.

2. The method claimed in claim 1 wherein said sheets of filter element material are metal and wherein the joining is by welding or soldering.

3. The method claimed in claim 1 wherein said sheets of filter material are thermoplastic organic polymer and wherein the joining is by welding.

* * * * *

UNITED STATES PATENT OFFICE
CERTIFICATE OF CORRECTION

Patent No. 3,792,519　　　　Dated February 19, 1974

Inventor(s) Fritz Haver

It is certified that error appears in the above-identified patent and that said Letters Patent are hereby corrected as shown below:

Under Foreign Application Priority Data

"62639" should read "H 62 639 VIIb/12d"

Signed and sealed this 17th day of September 1974.

(SEAL)
Attest:

McCOY M. GIBSON JR.
Attesting Officer

C. MARSHALL DANN
Commissioner of Patents